United States Patent
Cho et al.

(10) Patent No.: US 9,246,628 B2
(45) Date of Patent: Jan. 26, 2016

(54) HYBRID PASSIVE OPTICAL NETWORK SYSTEM

(71) Applicant: Electronics and Telecommunications Research Institute, Daejeon (KR)

(72) Inventors: Seung-Hyun Cho, Daejeon (KR); Jie Hyun Lee, Daejeon (KR); Seung Il Myong, Daejeon (KR); Sang Soo Lee, Daejeon (KR); Jong Hyun Lee, Daejeon (KR); Eui Suk Jung, Daejeon (KR); Kwang Ok Kim, Jeonbuk (KR)

(73) Assignee: Electronics and Telecommunications Research Institute, Daejeon (KR)

(*) Notice: Subject to any disclaimer, the term of this patent is extended or adjusted under 35 U.S.C. 154(b) by 238 days.

(21) Appl. No.: 13/728,089

(22) Filed: Dec. 27, 2012

(65) Prior Publication Data

US 2013/0170834 A1 Jul. 4, 2013

(30) Foreign Application Priority Data

Dec. 30, 2011 (KR) .................. 10-2011-0147648

(51) Int. Cl.
H04J 14/02 (2006.01)
(52) U.S. Cl.
CPC ............ *H04J 14/0278* (2013.01); *H04J 14/02* (2013.01); *H04J 14/025* (2013.01); *H04J 14/0246* (2013.01); *H04J 14/0247* (2013.01); *H04J 14/0252* (2013.01); *H04J 14/0282* (2013.01); *H04J 14/0298* (2013.01); *H04J 2014/0253* (2013.01)

(58) Field of Classification Search
None
See application file for complete search history.

(56) References Cited

U.S. PATENT DOCUMENTS

| | | | | |
|---|---|---|---|---|
| 4,783,851 | A * | 11/1988 | Inou et al. | 398/59 |
| 6,590,865 | B1 * | 7/2003 | Ibaraki et al. | 370/230 |
| 7,447,435 | B2 * | 11/2008 | Shin et al. | 398/90 |
| 2008/0267630 | A1 * | 10/2008 | Qian et al. | 398/89 |
| 2009/0097852 | A1 | 4/2009 | Qian et al. | |
| 2009/0274462 | A1 * | 11/2009 | Yu | 398/68 |
| 2010/0028002 | A1 | 2/2010 | Qian et al. | |
| 2010/0215368 | A1 | 8/2010 | Qian et al. | |
| 2011/0026923 | A1 * | 2/2011 | Kim et al. | 398/79 |

OTHER PUBLICATIONS

Giddings, R.P. et al., "Experimental Demonstration of Real-Time Optical OFDM Transmission at 11.25 Gb/s Over 500-m MMFs Employing Directly Modulated DFB Lasers," IEEE Photonics Technology Letters, vol. 23(1):51-53 (2011).

(Continued)

*Primary Examiner* — Darren E Wolf
(74) *Attorney, Agent, or Firm* — Nelson Mullins Riley & Scarborough LLP; Anthony A. Laurentano; Lewis Lee

(57) ABSTRACT

Provided is a hybrid passive optical network (PON) system. The hybrid PON system of wavelength division multiplexing (WDM)/time division multiplexing (TDM) may include an optical line terminal (OLT) and an optical network unit (ONU). The OLT and the ONU may transmit a signal based on wavelength reuse using a seed light source and a reflective modulator. The light source may include a seed light source having a single wavelength, two seed light sources having different wavelength bands, and a light source having a wavelength tunable characteristic.

13 Claims, 7 Drawing Sheets

(56) References Cited

OTHER PUBLICATIONS

Wei, J.L. et al., "Wavelength reused bidirectional transmission of adaptively modulated optical OFDM signals in WDM-PONs incorporating SOA and RSOA intensity modulators," Optics Express, vol. 18(10):9791-9808 (2010).

Yeh, Chien Hung et al., "Utilization of four WDM channels with signal remodulation of OFDM-QAM for 10 Gb/s uplink passive optical networks," Optics Communications, vol. 282:3701-3705 (2009).

* cited by examiner

HYBRID PASSIVE OPTICAL NETWORK SYSTEM

CROSS-REFERENCE TO RELATED APPLICATION

This application claims priority from and the benefit of Korean Patent Application No. 10-2011-0147648, filed on Dec. 30, 2011, which is hereby incorporated by reference for all purposes as if fully set forth herein.

BACKGROUND OF THE INVENTION

1. Field of the Invention

Exemplary embodiments of the present invention relate to a network architecture of a high-speed optical network system, and in particular, to a hybrid wavelength division multiplexing (WDM)/time division multiplexing (TDM) passive optical network (PON) system using an orthogonal frequency division multiplexing (OFDM)-based optical modem as a main method of transfer.

2. Discussion of the Background

A passive optical network (PON) is mainly built from a passive device having low power consumption, and uses an optical fiber as a main transmission medium. The PON may maximize a physical transmission bandwidth, and may ensure economical maintenance and repair, from a perspective of a service provider, due to the use of a passive device as a subscriber distributing means. Also, the PON has an advantage of being able to receive various existing multilevel modulated signals for improving a transmission bandwidth. Here, the PON corresponds to a most powerful candidate for a future optical subscriber network.

To date, research has been mainly directed to develop an optical transmitter and an optical receiver configured to enable transmission and reception across an optical link for upstream and downstream transmissions in an effort to commercialize usage of a PON. An optical transmitter and an optical receiver used in a conventional PON may enable upstream and downstream transmissions using a relatively expensive optical device, for example, a laser diode, an external modulator, and the like. For these reasons, upgrading of a system to meet additional bandwidth requirements is usually achieved in an aspect of hardware, which may impose an economical burden on a subscriber and may be an obstruction to system expansion and network re-construction and dynamic resource allocation for traffic control for efficient use of transmission resources.

In particular, a simple increase in a physical bandwidth of an optical transmitter and an optical receiver with increasing bandwidth required per subscriber may result in chromatic dispersion or polarization mode dispersion, and as a result, additional physical layer compensation technologies need to be provided, as well as development of a light source or an optical modulator allowing fast modulation. These additional technologies may result in a high capital expenditure.

To resolve the preceding issues, studies on an orthogonal frequency division multiplexing (OFDM)-based PON are being actively conducted in Europe and the U.S.A. to implement long-distance high-capacity transmission. Studies associated with an OFDM-based PON are generally centered on high-capacity transmission, for example, a maximum convergence bandwidth of 40 gigabits per second (Gbps) or more and long-distance, for example, 60 kilometers (km) and point-to-multipoint architecture, for example, a maximum of 64 points.

In general, a PON architecture has been implemented and developed through the use of two technologies including a time division multiplexing (TDM)-PON technology allowing upstream and downstream transmissions by allocating a time frame to each subscriber, and a wavelength division multiplexing (WDM)-PON technology allowing upstream and downstream transmissions by allocating a predefined specific wavelength to each subscriber.

Currently, a TDM-PON technology has a maximum upstream and downstream convergence bandwidth of 10 Gbps, and in a case of 64 points, has an average bandwidth per subscriber of about 150 megabits per second (Mbps). The TDM-PON technology has an advantage of adaptively responding to a change in bandwidth required per subscriber since the TDM-PON technology provides a dynamic bandwidth allocation function, but has a disadvantage of having to change optical transmitter and optical receiver hardware when a maximum convergence bandwidth is increased.

Conversely, a WDM-PON technology currently has an average bandwidth of about 1 Gbps per subscriber and, in principle, may have a maximum convergence bandwidth of up to 40 Gbps. However, a WDM-PON technology has disadvantages of lower network flexibility and a higher average installation cost per subscriber than a TDM-PON technology in that a bandwidth provided to each subscriber is determined based on a wavelength and a physical bandwidth limit of a light source allowing fast modulation. Also, an issue associated with additional physical layer compensation technologies for providing a high-speed bandwidth per wavelength will be happened.

SUMMARY OF THE INVENTION

Exemplary embodiments of the present invention provide a hybrid wavelength division multiplexing (WDM)/time division multiplexing (TDM) passive optical network (PON) system using an orthogonal frequency division multiplexing (OFDM) optical modem.

Additional features of the invention will be set forth in the description which follows, and in part will be apparent from the description, or may be learned by practice of the invention.

An exemplary embodiment of the present invention discloses an optical line terminal (OLT) of a hybrid PON system including a seed light source configured to provide CW light having a predetermined wavelength for injection, an optical transmitter configured to modulate the injected continuous wavelength (CW) light generated from the seed light source using a reflective modulator and to transmit a modulated OFDM downstream signal to an optical network unit (ONU), and an optical receiver configured to receive an OFDM upstream signal from the ONU, and the ONU may be configured to obtain a wavelength of the OFDM upstream signal from the OFDM downstream signal and to reuse a portion of the OFDM downstream signal as an OFDM upstream signal.

Another exemplary embodiment of the present invention discloses an ONU of a hybrid PON including an optical coupler configured to branch an OFDM downstream signal transmitted from an OLT, an optical receiver configured to receive a portion of the OFDM downstream signal through the optical coupler, and an optical transmitter configured to modulate the remaining portion of the OFDM downstream signal through the optical coupler using a reflective modulator and to transmit a modulated OFDM upstream signal to the OLT.

Still another exemplary embodiment of the present invention discloses an OLT of a hybrid PON system including a seed light source configured to provide a CW light having a predetermined wavelength, an optical transmitter configured to modulate the CW light generated from the seed light source using a reflective modulator and to transmit a modulated OFDM downstream signal to each of a plurality of ONUs, and an optical receiver configured to receive an OFDM upstream signal from each of the plurality of ONUs, and the plurality of ONUs may be configured to share a plurality of OFDM subcarriers associated with the OFDM downstream signal, to obtain a wavelength of the OFDM upstream signal from the OFDM downstream signal, and to reuse a portion of the OFDM downstream signal as an OFDM upstream signal.

Yet another exemplary embodiment of the present invention discloses a plurality of ONUs of a PON system, each including an optical coupler configured to divide an OFDM downstream signal transmitted from an OLT, an optical receiver configured to receive a portion of the OFDM downstream signal through at least one allocated OFDM subcarrier among a plurality of OFDM subcarriers using the optical coupler, and an optical transmitter configured to modulate the remaining portion of the OFDM downstream signal through the optical coupler using a reflective modulator and to transmit a modulated OFDM upstream signal to an OLT through the at least one allocated OFDM subcarrier among the plurality of OFDM subcarriers.

Further another exemplary embodiment of the present invention discloses an OLT of a hybrid PON system including a seed light source configured provide a CW light having a predetermined wavelength, an optical transmitter configured to modulate the CW light generated from the seed light source using a reflective modulator and to transmit a modulated OFDM downstream signal to each of a plurality of ONUs, and an optical receiver configured to receive an OFDM upstream signal from each of the plurality of ONUs, and the plurality of ONUs may be configured to share one OFDM subcarrier associated with the OFDM downstream signal by TDM, to obtain a wavelength of the OFDM upstream signal from the OFDM downstream signal, and to reuse a portion of the OFDM downstream signal as an OFDM upstream signal.

Still another exemplary embodiment of the present invention discloses a plurality of ONUs of a PON system, each including an optical coupler configured to devide an OFDM downstream signal transmitted from an OLT, an optical receiver configured to receive a portion of the OFDM downstream signal through one OFDM subcarrier using the optical coupler, and an optical transmitter configured to modulate the remaining portion of the OFDM downstream signal through the optical coupler using a reflective modulator and to transmit a modulated OFDM upstream signal to an OLT through the one OFDM subcarrier by TDM.

Still another exemplary embodiment of the present invention discloses an OLT of a hybrid PON system including an optical transmitter configured to transmit an OFDM downstream signal to an ONU using a first wavelength tunable light source, and an optical receiver configured to receive an OFDM upstream signal generated from the ONU based on a second wavelength tunable light source, and the first wavelength tunable light source and the second wavelength tunable light source may provide lights having different wavelengths.

Still another exemplary embodiment of the present invention discloses a plurality of ONUs of a PON system, each including an wavelength dependent optical coupler configured to seperate an OFDM downstream signal transmitted based on a first wavelength tunable light source of an OLT, an optical receiver configured to receive a portion of the OFDM downstream signal through one OFDM subcarrier using the wavelength dependent optical coupler, and an optical transmitter configured to transmit an OFDM upstream signal to the OLT using a second wavelength tunable light source.

Still another exemplary embodiment of the present invention discloses an OLT of a hybrid PON system including an optical transmitter configured to transmit an OFDM downstream signal to each of a plurality of ONUs using a wavelength tunable light source, and an optical receiver configured to receive an OFDM upstream signal generated from each of the plurality of ONUs based on the wavelength tunable light source, and the plurality of ONUs may be configured to share one OFDM subcarrier by TDM or share a plurality of OFDM subcarriers.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
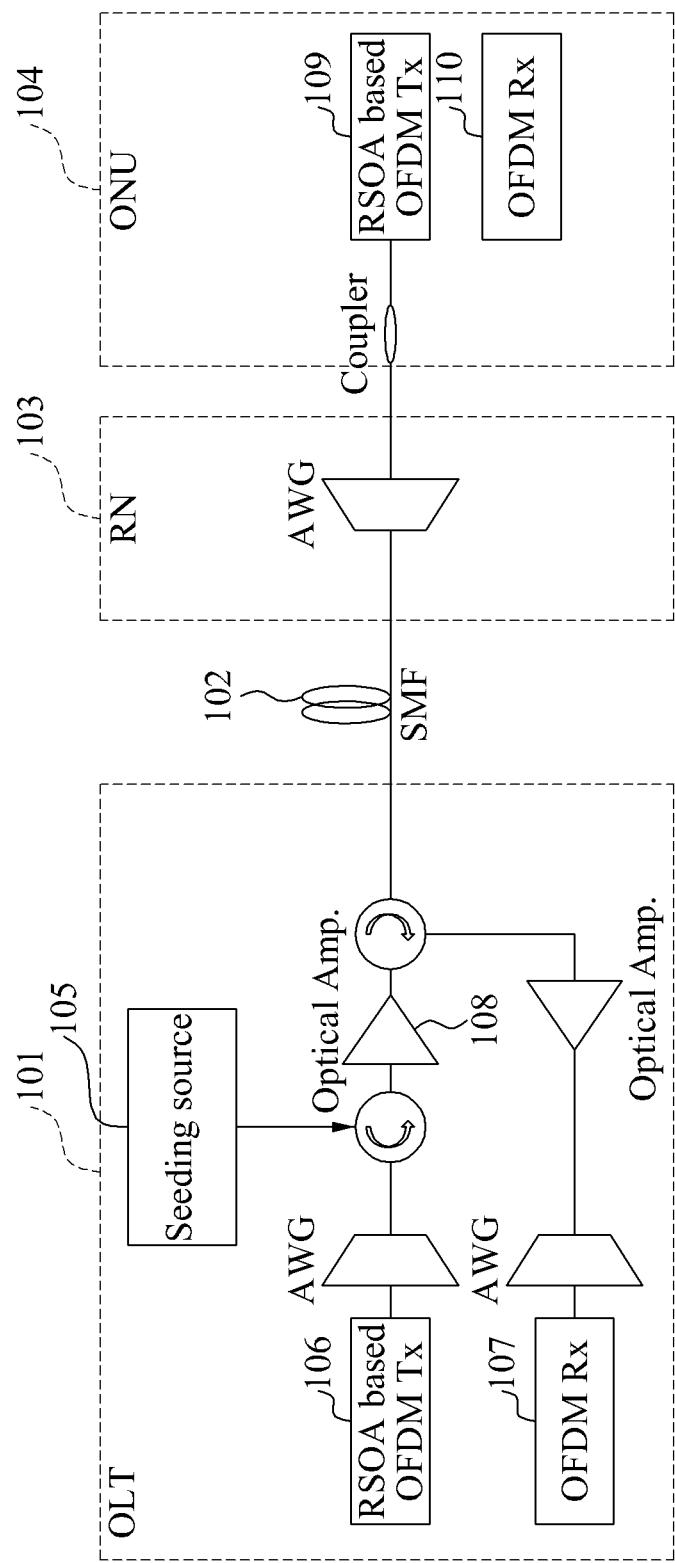
FIG. 1 is a diagram illustrating a hybrid passive optical network (PON) system using a single seed light source and a reflective modulator according to an exemplary embodiment of the present invention.

The invention is described more fully hereinafter with reference to the accompanying drawings, in which exemplary embodiments of the invention are shown. This invention may, however, be embodied in many different forms and should not be construed as limited to the embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element is referred to as being "connected to" another element, it can be directly connected to the other element, or intervening elements may be present.

The present invention may have the following exemplary embodiments.

(1) a hybrid passive optical network (PON) system including a seed light source supporting a single wavelength band, reflective modulators, and multiple optical network units (ONUs) as shown in FIG. 1.

Figure 2:
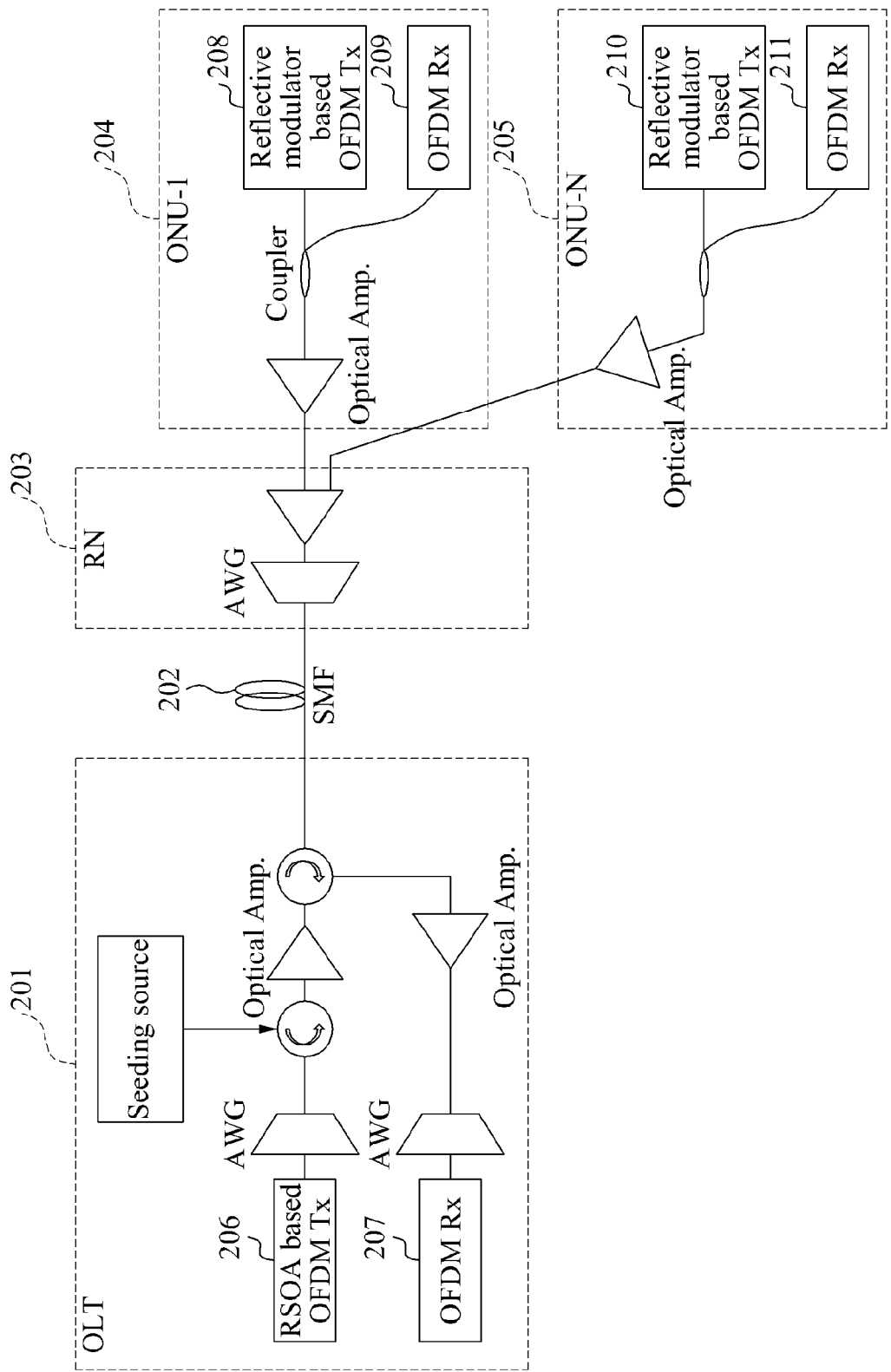
FIG. 2 is a diagram illustrating a hybrid PON system based on a multiple access using a single seed light source and a reflective modulator according to an exemplary embodiment of the present invention.
Figure 3:
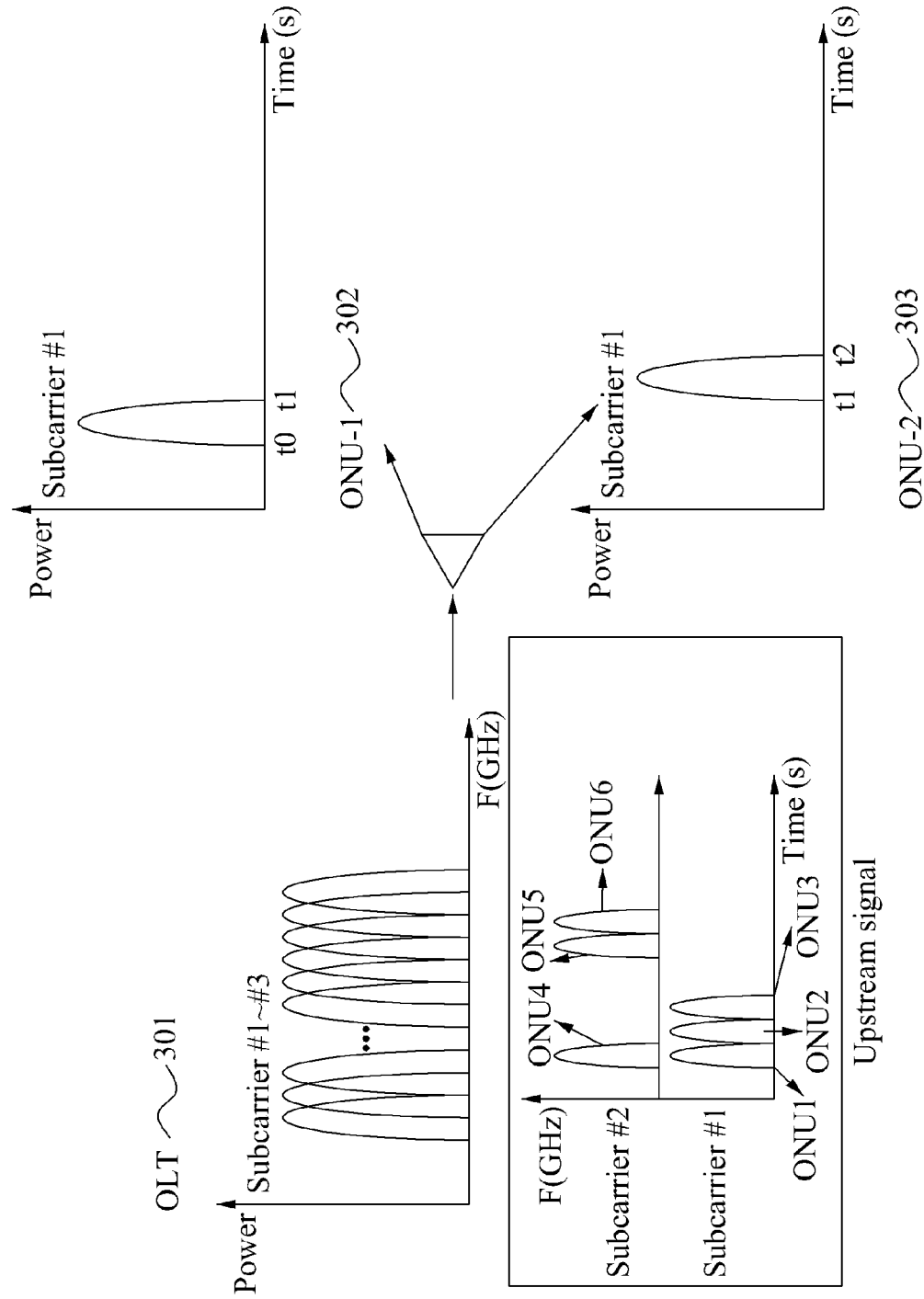
FIG. 3 is a diagram illustrating time division multiplexing (TDM)-based subcarrier sharing according to an exemplary embodiment of the present invention.

(2) a hybrid PON system including a seed light source supporting a single wavelength band, reflective modulators, and a plurality of ONUs sharing a single OFDM subcarrier by wavelength division multiplexing (WDM)/time division multiplexing (TDM) as shown in FIGS. 2 and 3.

Figure 4:
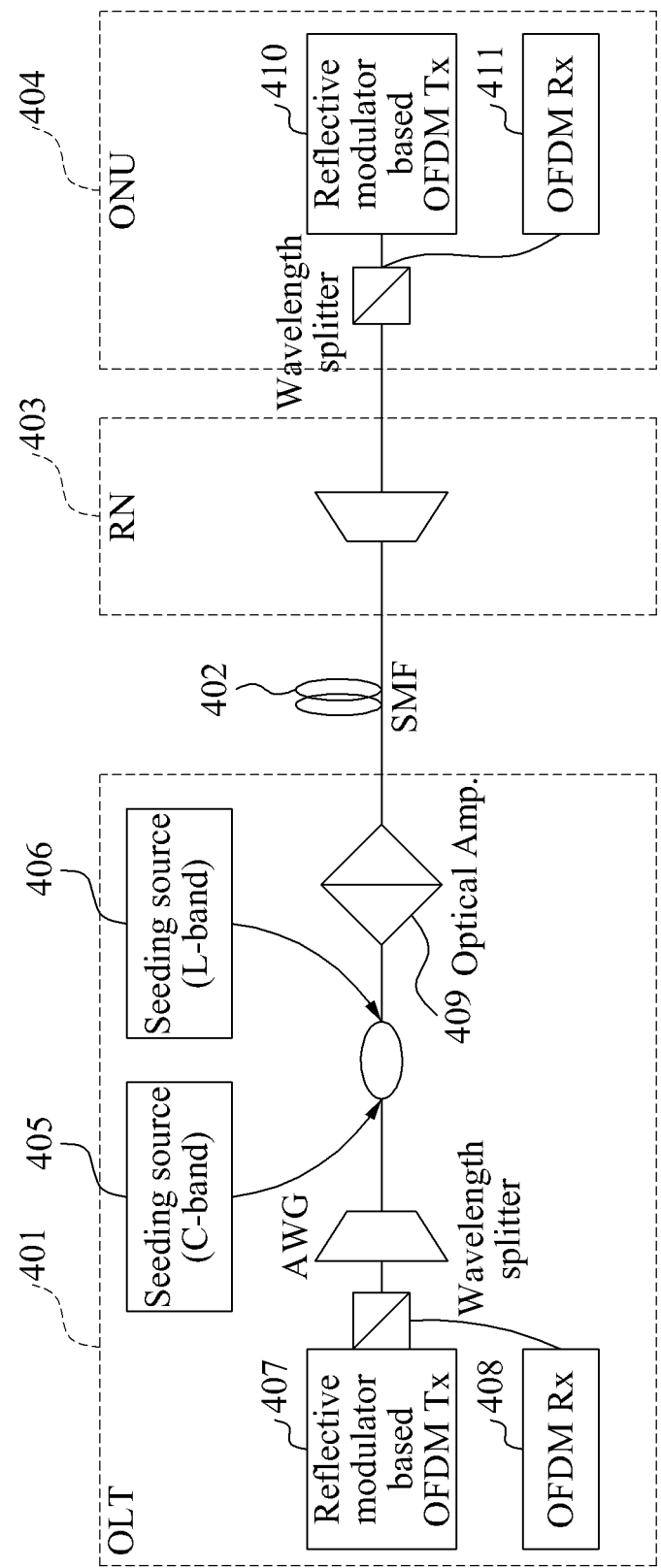
FIG. 4 is a diagram illustrating a hybrid PON system using two seed light sources and a reflective modulator according to an exemplary embodiment of the present invention.

(3) a hybrid PON system including two seed light sources supporting different wavelength bands, reflective modulators, and multiple ONUs as shown in FIG. 4.

Figure 5:
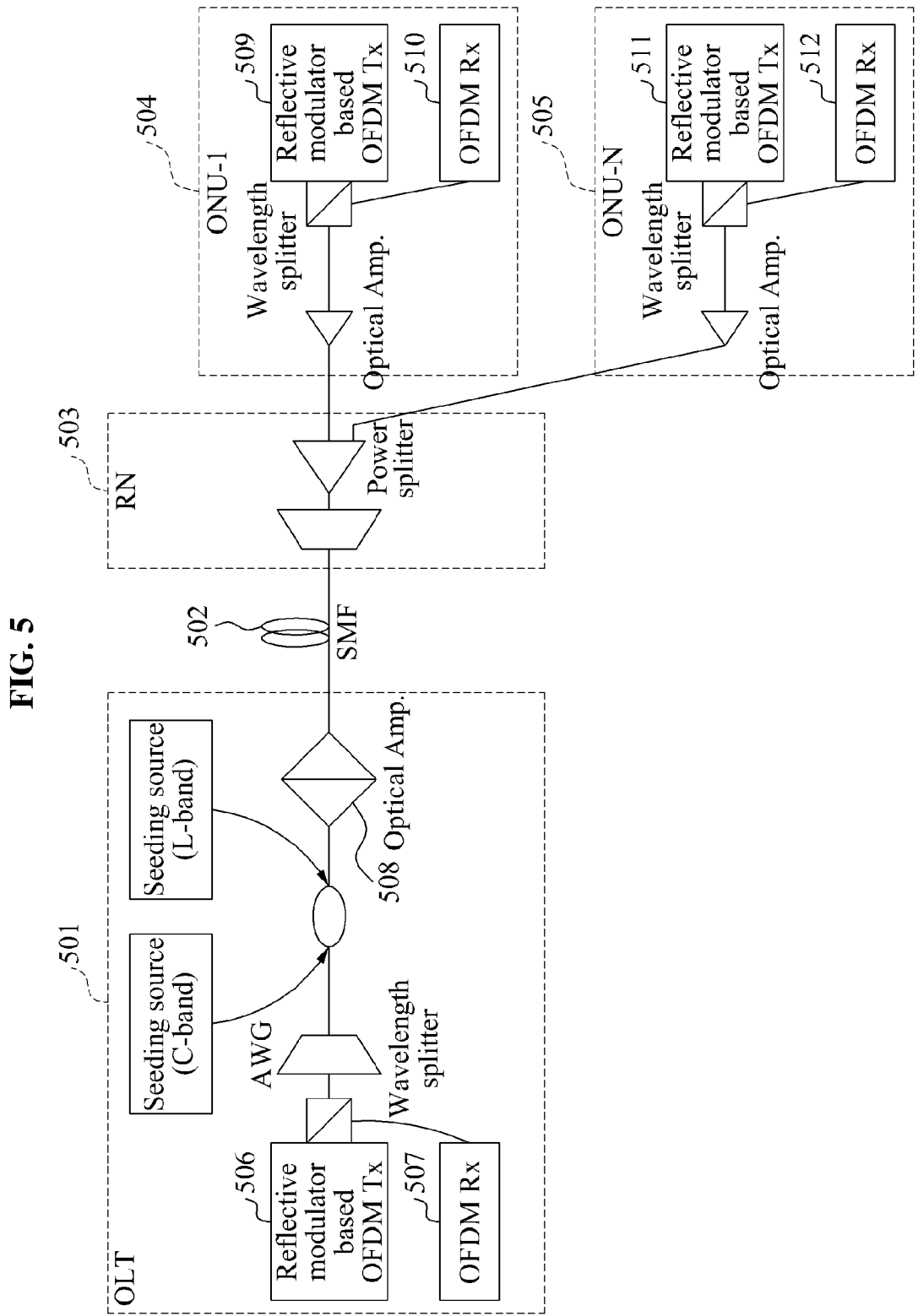
FIG. 5 is a diagram illustrating a hybrid PON system based on a multiple access using two seed light sources and a reflective modulator according to an exemplary embodiment of the present invention.

(4) a hybrid PON system including two seed light sources supporting different wavelength bands, reflective modulators, and a plurality of ONUs sharing a single OFDM subcarrier by WDM/TDM as shown in FIG. 5.

Figure 6:
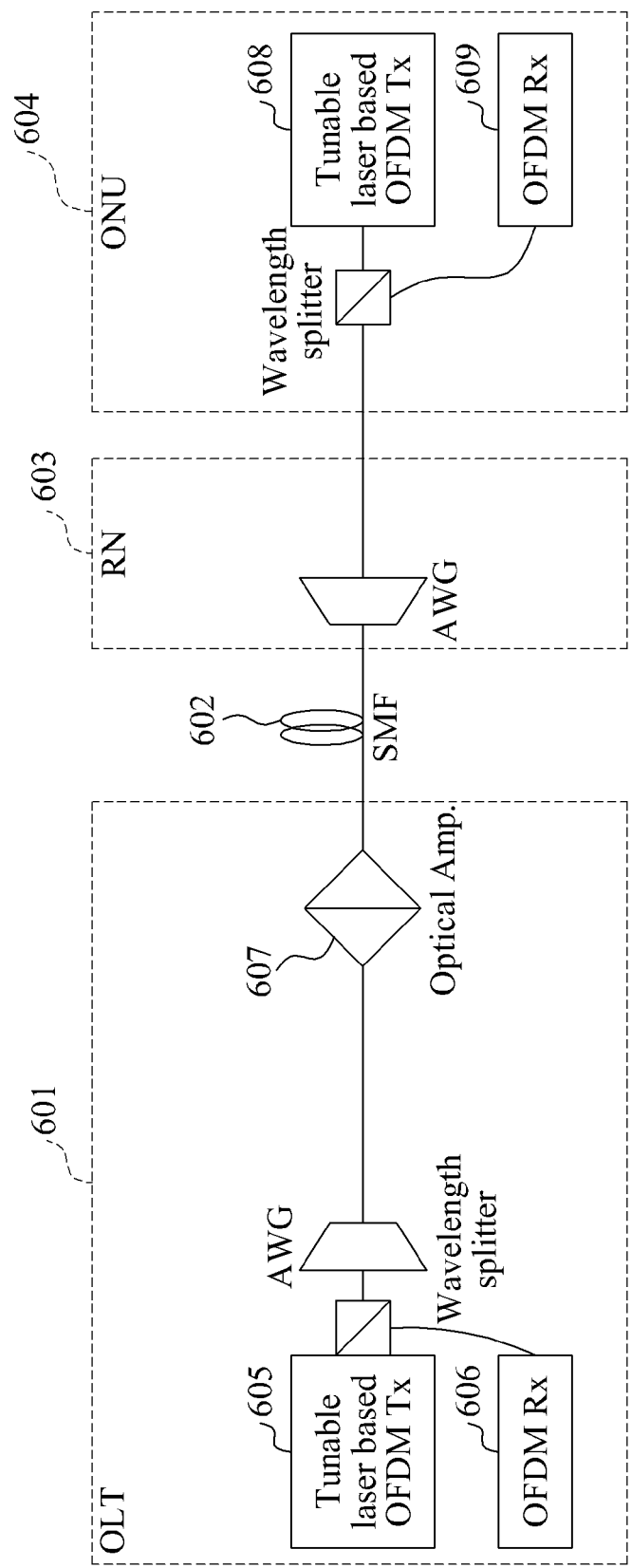
FIG. 6 is a diagram illustrating a hybrid PON system using a wavelength tunable light source according to an exemplary embodiment of the present invention.

(5) a hybrid PON system using light sources having a wavelength tunable characteristics and multiple ONUs as shown in FIG. 6.

Figure 7:
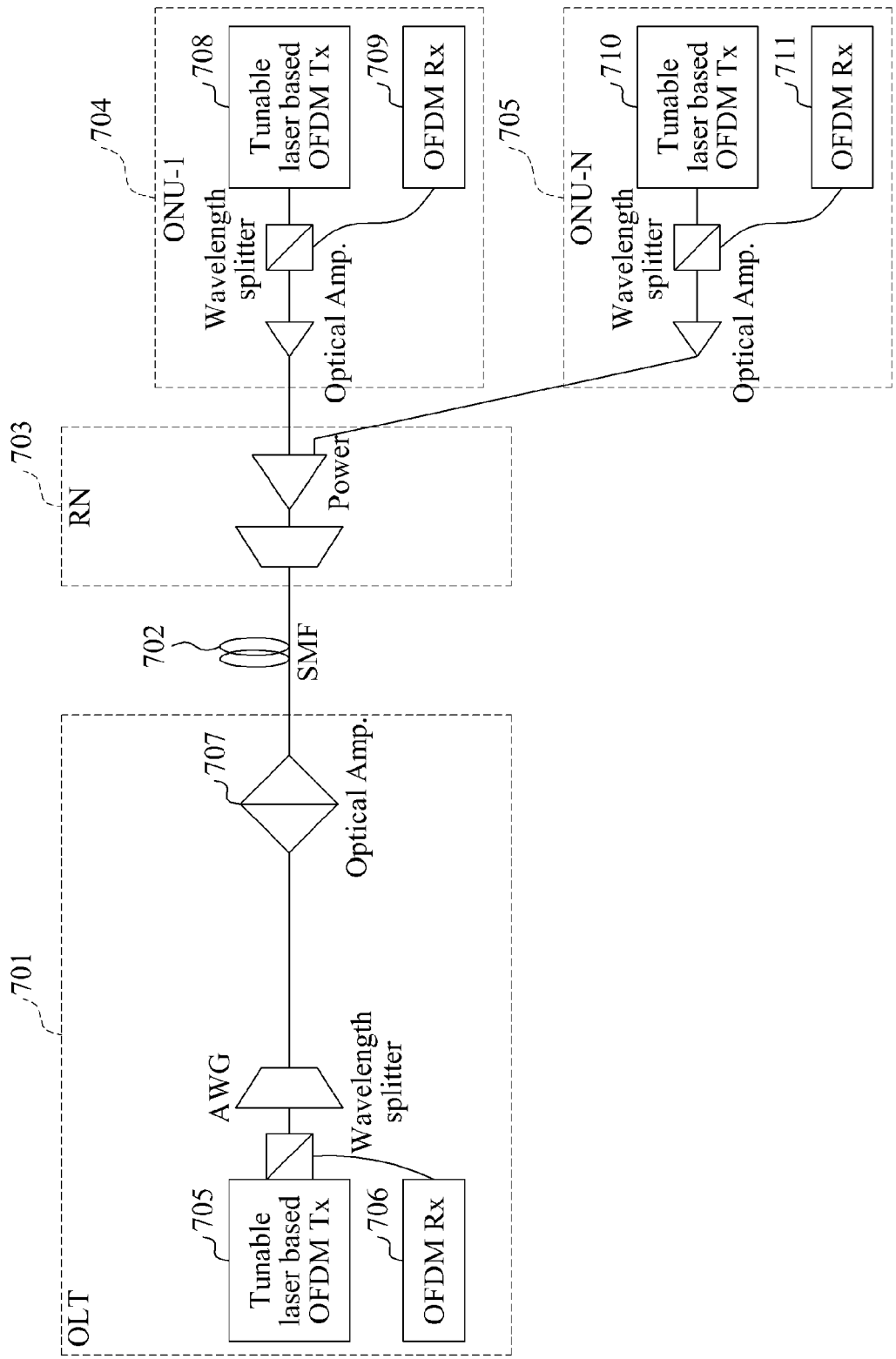
FIG. 7 is a diagram illustrating a hybrid PON system based on a multiple access using a wavelength tunable light source according to an exemplary embodiment of the present invention.

(6) a hybrid PON system using light sources having a wavelength tunable characteristics and a plurality of ONUs sharing a OFDM subcarrier by WDM/TDM as shown in FIG. 7.

FIG. 1 is a diagram illustrating a hybrid PON system using a single seed light source and a reflective modulator according to an exemplary embodiment of the present invention.

Referring to FIG. 1, the hybrid PON system may include an optical line terminal (OLT) 101, a single mode fiber (SMF) 102, a remote node (RN) 103, and an optical network unit (ONU) 104.

The OLT 101 may include a reflective modulator-based optical transmitter 106 and an optical receiver 107, and the ONU 104 may include a reflective modulator-based optical transmitter 109 and an optical receiver 110. In this instance, the OLT 101 and the ONU 104 may transmit and receive an orthogonal frequency division multiplexing (OFDM) signal. Here, the reflective modulator may include a reflective semiconductor optical amplifier (RSOA), a Fabry-Perot laser diode (FP-LD), and a reflective electro-absorption modulator integrated with semiconductor optical amplifier (REAM-SOA). In particular, FIG. 1 illustrates the hybrid WDM-OFDM PON system provided with the ONU 104 using the reflective modulator that may obtain a wavelength of an upstream optical signal from a downstream optical signal and may reuse a portion of the downstream optical signal as an upstream optical signal.

A link structure of FIG. 1 may be similar to a WDM-PON structure with wavelength reuse scheme using an RSOA and the like. A wavelength of the downstream optical signal may be determined by a seed light source 105 included in the OLT 101. The seed light source may be supplied array type light source by providing, per wavelength, a single longitudinal mode operated laser (SML), for example, a distributed feedback laser diode (DFB-LD), a distributed Bragg reflector (DBR) laser, an external cavity laser (ECL), and a vertical cavity surface emitting laser (VCSEL), or may be supplied by spectrum-slicing a broadband light source from an erbium doped fiber amplifier (EDFA), a semiconductor optical amplifier (SOA), and a super-luminescent light emitting diode (SLED).

An operation of the hybrid PON system of FIG. 1 may be performed as follows.

An optical seed light having an arbitrary wavelength generated from the seed light source 105 may be supplied to the reflective modulator-based optical transmitter 106 through an optical circulator and an arrayed waveguide grating (AWG). The optical transmitter 106 may modulate an OFDM downstream optical signal using the reflective modulator, and may transmit the OFDM downstream optical signal to the ONU 104 through the SMF 102 of a feeder optical fiber and the RN 103.

In this instance, an optical amplifier 108 included in the OLT 101 may be selectively used based on an optical link length and a link power budget required to receive a signal. For example, when the link transmission distance is beyond 20 kilometers (km) or the link power budget beyond 20 decibels (dB), use of the optical amplifier 108 may be necessary.

Also, according to characteristics of the WDM-PON architecture with wavelength reuse scheme, transmitting a downstream optical signal with a limited optical modulation index (OMI) may be required. The OMI refers to a difference between a maximum value and a minimum value of a digital-to-analog converted optical signal. The higher an OMI, the greater the change in signal intensity of the optical signal, conversely, the lower an OMI, the smaller the change in signal intensity of the optical signal. When the RSOA or SOA operates in a gain-saturated regime, re-modulation can be achieved with a minimal intensity fluctuation. Accordingly, limiting the proper OMI should be necessary. When the OMI is higher than a critical value, re-modulating the upstream optical signal may be impossible, and a relatively great power penalty may be happened when transmitting the upstream optical signal.

A portion of the downstream optical signal passed through the RN 103 may go to the optical receiver 110 through an optical coupler located at the front end of the ONU 104, and the remaining portion of the downstream optical signal may directly go through the optical transmitter 109. The reflective modulator-based optical transmitter 109 may use the remaining portion of the downstream optical signal in wavelength reuse scheme for generating an upstream optical signal.

In this instance, a coupling ratio of the optical coupler may be carefully determined based on an optical link length, a power budget, and an optical gain of the reflective modulator. Here, conventionally, the optical coupler may have a coupling ratio of 50:50. However, when the link length is beyond 20 km and the optical link power budget is beyond 20 dB, the coupling ratio may be adjusted to 60:40 or 70:30 to increase an optical power injected into the reflective modulator-based optical transmitter 109. That is, when the optical link length or the optical link power budget is increased, the optical coupler may adjust the coupling ratio to increase the downstream optical signal supplied to the optical transmitter 109.

The reflective modulator-based optical transmitter 109 included in the ONU 104 may modulate an OFDM upstream optical signal directly and may transmit the modulated the upstream signal to the OLT 101. The OFDM upstream optical signal generated by the ONU 104 may go to the OLT 101 through the RN 103 and the SMF 102 of the feeder span again. Also, an optical amplifier may be selectively used based on a length of the feeder optical fiber and an entire link power budget. The OFDM upstream optical signal passed through the amplifier may be injected, and detected, in the optical receiver 107 through an AWG located at the OLT 101.

FIG. 2 is a diagram illustrating a hybrid PON system based on a multiple access using a single seed light source and reflective modulators according to an exemplary embodiment of the present invention.

FIG. 2 illustrates a hybrid PON system based on a multiple access by enabling a plurality of OFDM subcarriers to share a signal having the same wavelength. The architecture of FIG. 2 is essentially identical to that of FIG. 1, however a power splitter may be located at the end of an AWG of an RN 203 to enable a plurality of ONUs 204 and 205 to share a plurality of OFDM subcarriers and to transmit an upstream optical signal and a downstream optical signal through the shared OFDM subcarrier.

For example, when about 128 subcarriers are present at a single wavelength, upstream and downstream transmissions may be achieved through the subcarriers allocated to each of 128 ONUs. Also, a bandwidth may be adjusted, for example, increased or decreased, by controlling the number of the subcarriers for each ONU. The controlling of the subcarriers may be achieved in a media access control (MAC) layer. For example, a first ONU requests additional bandwidth allocation, a first idle subcarrier may be additionally allocated to the first ONU through the operation of MAC layer. That is, when the first ONU requests additional bandwidth allocation while using the first subcarrier, a 127th idle subcarrier may be additionally allocated to the first ONU.

Conversely, when the first ONU requests bandwidth limiting or reverting while using the first subcarrier and the 127th subcarrier, the 127th subcarrier may be reverted to reduce the bandwidth. Also, an optical amplifier may be additionally used at an input terminal of the ONUs 204 and 205 to additionally compensate for an insertion loss caused by the optical power splitter. The optical amplifier may enable bi-directional amplification. Also, the optical amplifier may enable uni-directional amplification, for example, in a direction toward an input terminal or an output terminal separately.

FIG. 3 is a diagram illustrating TDM-based subcarrier sharing according to an exemplary embodiment of the present invention.

FIG. 3 illustrates that a plurality of ONUs shares one subcarrier by TDM based on the link structure of FIG. 2. As shown in FIG. 3, since a plurality of ONUs shares one subcarrier at the same time, an upstream optical signal may be transmitted in a burst mode in a time domain. For example, an ONU-1 302 may transmit upstream signal using a subcarrier #1 in a time frame 1 having an interval between t0 and t1, and an ONU-2 303 may transmit upstream signal using the same subcarrier #1 in a time frame 2 having an interval between t1 and t2.

As a wavelength associated with all the subcarriers and the time frame, a single wavelength may be used. According to FIG. 3, since OFDM multiplexing access and TDM multiplexing access are allowed at the same time, a number of ONUs are able to use the same feeder optical fiber at the same time may increase. Also, an advantage of precise control, for example, precise control for increasing or decreasing an effective bandwidth may be provided to each ONU at the same time. For example, when a single subcarrier has an effective bandwidth of 100 megabits per second (Mbps), 10 ONUs may share the single subcarrier by dividing into 10 Mbps so that the ONUs may transmit upstream and downstream signals through TDM access.

FIG. 4 is a diagram illustrating a hybrid PON system using two seed light sources and a reflective modulator according to an exemplary embodiment of the present invention.

FIG. 4 illustrates that an upstream optical signal and a downstream optical signal may be transmitted using seed light sources having different wavelength bands. Each seed light source may be identical to that of FIG. 1. However, seed lights generated from the two kinds of seed light sources may have different wavelength bands.

For example, when a seed light source 406 for a downstream signal provides a CW seed light using an L-band, a seed light source 405 for an upstream signal may provide a seed light using C-, S-, E-, and O-bands. By way of reference, the wavelength band of the seed light may be changed depending on an application field, and it is unnecessary to set to a predetermined wavelength band. However, descriptions of the present invention are based on a C-band designated as a wavelength band of an upstream optical signal and an L-band designated as a wavelength band of a downstream optical signal, for conciseness and ease of description.

The L-band seed light generated from the seed light source 406 may be supplied to a reflective modulator-based optical transmitter 407 through an optical fiber coupler and an AWG. The optical transmitter 407 may modulate an OFDM downstream optical signal, using the reflective modulator, and transmit the signal to an ONU 404. By way of reference, the AWG may have cyclic characteristics, and according to the cyclic characteristics, may receive a C-band signal and an L-band signal in a transmission band simultaneously. A C/L wavelength splitter may be located ahead of the optical transmitter 407 and an optical receiver 408 included in an OLT 401 to supply the seed light corresponding to the L-band to the reflective modulator-based optical transmitter 407 and supply an OFDM upstream optical signal based on the seed light corresponding to the C-band to the optical receiver 408. An OFDM downstream signal generated by the optical transmitter 407 may pass through the AWG again and may go through an SMF 402 of a feeder optical fiber and an AWG located at an RN 403.

An optical amplifier 409 may be selectively used based on an optical link length and a link power budget needed to receive a signal. For example, when the link transmission distance is beyond 20 km and the link power budget is beyond 20 dB, use of the optical amplifier 409 may be necessary.

Similarly, the C-band seed light generated from the seed light source 405 for transmission of an upstream optical signal may be supplied to the ONU 404 through the SMF 402 of the feeder optical fiber and the AWG of the RN 403. Similar to the OLT 401, the seed light supplied to the ONU 404 may pass through the C/L wavelength splitter, and the seed light corresponding to the C-band may be supplied to a reflective modulator-based optical transmitter 410 and an OFDM downstream signal based on the seed light corresponding to the L-band may be injected into an optical receiver 411 and may be detected.

The OFDM upstream signal may be modulated directly through the reflective modulator of the optical transmitter 410 corresponding to the C-band, and may go to the OLT 401 through the AWG of the RN 403 and the SMF 402 of the feeder optical fiber again. The optical amplifier 409 located at the front end of the OLT 401 may be selectively used based on a link power budget and a link length, similar to the OFDM downstream optical signal. The OFDM upstream optical signal may be injected into the optical receiver 408 through the AWG and the C/L wavelength splitter included in the OLT 401 again and may be detected.

FIG. 5 is a diagram illustrating a hybrid PON system based on a multiple access using two seed light sources and reflective modulators according to an exemplary embodiment of the present invention.

FIG. 5 illustrates a multiple access architecture by a plurality of OFDM subcarriers sharing a signal having the same wavelength. FIG. 5 is similar to FIG. 4, aside from the presence of a plurality of ONUs and power splitter. In FIG. 5, a power splitter may be located at the end of an AWG of an RN 503 to enable a plurality of ONUs, that is ONU-1 504 through ONU-N 505, to share a plurality of OFDM subcarriers so that the plurality of ONUs may transmit an OFDM upstream optical signal and an OFDM downstream optical signal through the allocated OFDM subcarriers.

For example, when about 128 subcarriers are present at a single wavelength, upstream and downstream transmissions may be executed through the subcarriers allocated to each of 128 ONUs. Also, a bandwidth may be adjusted, for example, increased or decreased by controlling the number of the subcarriers for each ONU. The controlling of the subcarriers may be achieved in a MAC layer. For example, when a first ONU requests additional bandwidth allocation, a first idle subcarrier may be additionally allocated to the first ONU through operation of the MAC layer. That is, when the first ONU requests additional bandwidth allocation while using the first subcarrier, a 127th idle subcarrier may be additionally allocated to the first ONU.

Conversely, when the first ONU requests bandwidth limiting or reverting while using the first subcarrier and the 127th subcarrier, the 127th subcarrier may be reverted to reduce the bandwidth. Also, an optical amplifier may be additionally used at input terminals of the ONUs 504 and 505 to additionally compensate for an insertion loss caused by the power splitter. The optical amplifier may enable bi-directional amplification. Also, the optical amplifier may enable mono-directional amplification, for example, in a direction toward an input terminal or an output terminal separately.

Similar to FIG. 3, the plurality of ONUs, that is, ONU-1 504 through ONU-N 505, may share a single subcarrier by TDM through the architecture of FIG. 5.

As described with reference to FIG. 3, since a plurality of ONUs share one subcarrier at the same time, an upstream optical signal may be transmitted in a burst mode in a time domain. For example, the ONU-1 302 may achieve upstream transmission using the subcarrier #1 in the time frame 1 having the interval between t0 and t1, and the ONU-2 303 may achieve upstream transmission using the same subcarrier #1 in the time frame 2 having the interval between t1 and t2.

As a wavelength associated with all the subcarriers and the time frame, a single wavelength may be used. According to FIG. 5, since OFDM multiplexing access and TDM multiplexing access are allowed at the same time, a number of ONUs able to use the same feeder optical fiber at the same time may increase. Also, an advantage of precise control, for example, precise control for increasing or decreasing an effective bandwidth may be provided to each ONU simultaneously. For example, when a single subcarrier has an effective bandwidth of 100 Mbps, 10 ONUs may share the single subcarrier by dividing into 10 Mbps so that the ONUs may obtain upstream and downstream transmissions through TDM access.

FIG. 6 is a diagram illustrating a hybrid PON system using wavelength tunable light sources according to an exemplary embodiment of the present invention.

Referring to FIG. 6, an optical transmitter 605 of an OLT 601 and an optical transmitter 608 of an ONU 604 may use wavelength tunable light sources. By way of example, a wavelength tunable light source, for example, a sampled grating distributed Bragg reflector laser (SG-DBR) and a planar lightwave circuit based external cavity laser (PLC-ECL), may be used as light sources for upstream and downstream transmissions by the OLT 601 and the ONU 604.

However, light generated from the wavelength tunable light source of the OLT 601 and the ONU 604 may have different wavelength bands. For example, when a wavelength band of a wavelength tunable light source for an OFDM downstream optical signal corresponds to an L-band, a wavelength band of a wavelength tunable light source for an OFDM upstream optical signal may correspond to C-, S-, E-, and O-bands.

By way of reference, the wavelength band of the wavelength tunable light source may be changed depending on an application field, and it is unnecessary to set to a predetermined wavelength band. However, descriptions of the present invention are based on a C-band designated as a wavelength band of an upstream optical signal and an L-band designated as a wavelength band of a downstream optical signal, for conciseness and ease of description.

The optical transmitter 605 including the variable wavelength light source corresponding to the L-band may modulate an OFDM downstream optical signal, and may transmit the signal to the ONU 604. By way of reference, an AWG may have cyclic characteristics, and according to the cyclic characteristics, may receive C- and L-band signals, or S-, E-, and O-band signals, in a transmission band at the same time. A C/L wavelength band splitter may be also located before the optical transmitter 605 and the optical receiver 606 included in the OLT 601 to transmit, to the ONU 604, an OFDM downstream optical signal generated from the optical transmitter 605 including the wavelength tunable light source corresponding to the L-band and to transmit, to the optical receiver 606 of the OLT 601, an OFDM upstream optical signal from an optical transmitter 608 including the wavelength tunable light source corresponding to the C-band.

The OFDM downstream optical signal may pass through an AWG of the OLT 601 having cyclic characteristics and may go through an SMF 602 of a feeder optical fiber and an AWG located at an RN 603. In this instance, an optical amplifier 607 may be used selectively, based on an optical link length and a link power budget. The OFDM downstream optical signal corresponding to the L-band may be injected into the optical receiver 609 of the ONU 604 through the C/L wavelength splitter and may be detected. Also, the OFDM upstream optical signal may be transmitted to the OLT 601 through the C/L wavelength splitter.

The OFDM upstream optical signal may be modulated by the optical transmitter 608 including the wavelength tunable light source corresponding to the C-band, and go to the OLT 601 through the AWG of the RN and the SMF 602 of the feeder optical fiber. The OLT 601 may use the optical amplifier 607 selectively, based on an optical link length and a link power budget, similar to the downstream optical signal. The OFDM upstream optical signal may be injected into the optical receiver 606 through the AWG located at the OLT 601 and the C/L wavelength splitter again, and may be detected.

FIG. 7 is a diagram illustrating a hybrid PON system based on a multiple access using wavelength tunable light sources according to an exemplary embodiment of the present invention.

FIG. 7 illustrates a multiple access architecture by a plurality of OFDM subcarriers sharing a signal having the same wavelength. The architecture of FIG. 7 is essentially identical to that of FIG. 6. However a power splitter may be located at the end of an AWG of an RN 703 to enable a plurality of ONUs, that is, ONU-1 704 through ONU-N 705, to share a plurality of OFDM subcarriers to enable upstream and downstream transmissions.

For example, when about 128 subcarriers are at a single wavelength, upstream and downstream transmissions may be achieved through the subcarriers allocated to each of 128 ONUs. Also, a bandwidth may be adjusted, for example, increased or decreased by controlling the number of the subcarriers for each ONU. The controlling of the subcarriers may be achieved in an MAC layer. For example, a first ONU requests additional bandwidth allocation, a first idle subcarrier may be additionally allocated to the first ONU through the operation of MAC layer. That is, when the first ONU requests additional bandwidth allocation while using the first subcarrier, a 127th idle subcarrier may be additionally allocated to the first ONU.

Conversely, when the first ONU requests bandwidth limiting or reverting while using the first subcarrier and the 127th subcarrier, the 127th subcarrier may be reverted to reduce the bandwidth. Also, an optical amplifier may be additionally used at an input ports of the ONUs 704 and 705 to additionally compensate for an insertion loss caused by the power splitter. The optical amplifier may enable bi-directional amplification. Also, the optical amplifier may enable uni-directional amplification, for example, in a direction toward an input port or an output port separately.

Similar to FIG. 3, the plurality of ONUs, that is, ONU-1 704 through ONU-N 705, may share a single subcarrier by TDM through the architecture of FIG. 7.

As described with reference to FIG. 3, since a plurality of ONUs share one subcarrier simultaneously, an upstream optical signal may be transmitted in a burst mode in a time domain. For example, the ONU-1 704 may achieve upstream transmission using the subcarrier #1 in the time frame 1 having the interval between t0 and t1, and the ONU-N 705 may achieve upstream transmission using the same subcarrier #1 in the time frame 2 having the interval between t1 and t2.

As a wavelength associated with all the subcarriers and the time frame, a single wavelength may be used. According to FIG. 7, since OFDM multiplexing access and TDM multiplexing access are allowed at the same time, a number of ONUs able to use the same feeder optical fiber at the same time may increase. Also, an advantage of precise control, for example, control for increasing or decreasing an effective bandwidth may be provided to each ONU simultaneously. For example, when a single subcarrier has an effective bandwidth of 100 Mbps, 10 ONUs may share the single subcarrier by dividing into 10 Mbps so that the ONUs may obtain upstream and downstream transmissions through TDM access.

At least one optical network unit (ONU) of a hybrid passive optical network (PON) system, each ONU comprising: an wavelength splitter configured to split an orthogonal frequency division multiplexing (OFDM) downstream optical signal transmitted based on a first wavelength tunable light source of an optical line terminal (OLT); an optical receiver configured to receive a portion of the OFDM downstream optical signal through one OFDM subcarrier using the wavelength splitter; and an optical transmitter configured to transmit an OFDM upstream optical signal to the OLT using a second wavelength tunable light source. The plurality of ONUs is configured to share one OFDM subcarrier by time division multiplexing (TDM) or to share a plurality of OFDM subcarriers.

The exemplary embodiments according to the present invention may be recorded in non-transitory computer-readable media including program instructions to implement various operations embodied by a computer. The media may also include, alone or in combination with the program instructions, data files, data structures, and the like. The media and program instructions may be those specially designed and constructed for the purposes of the present invention, or they may be of the kind well-known and available to those having skill in the computer software arts. Examples of non-transitory computer-readable media include magnetic media such as hard discs, floppy discs, and magnetic tape; optical media such as CD ROM discs and DVD; magneto-optical media such as floppy discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments of the present invention.

According to the exemplary embodiments of the present invention, the hybrid WDM-TDM-OFDM PON system may compensate for disadvantages of WDM- and TDM-PON technologies.

According to the exemplary embodiments of the present invention, the hybrid WDM-TDM-OFDM PON system may provide point-to-multipoint and long-distance transmission and a high bandwidth per subscriber.

According to the exemplary embodiments of the present invention, the hybrid WDM-TDM-OFDM PON system may have an application for a next-generation wired/wireless converged network structure.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. An optical line terminal (OLT) of a hybrid passive optical network (PON) system, the OLT comprising:
   a seed light source configured to provide a seed light having a predetermined wavelength;
   an optical transmitter configured to modulate the seed light generated from the seed light source using a reflective modulator, and to transmit a modulated orthogonal frequency division multiplexing (OFDM) downstream optical signal to a plurality of optical network units (ONUs); and
   an optical receiver configured to receive an OFDM upstream optical signal from the at least one ONU,
   wherein the plurality of ONUs is configured to obtain a wavelength of the OFDM upstream optical signal from the OFDM downstream optical signal and to reuse a portion of the OFDM downstream optical signal as the OFDM upstream optical signal,
   wherein the plurality of ONUs is configured to share one OFDM subcarrier associated with the OFDM downstream optical signal by time division multiplexing (TDM), to obtain a wavelength of the OFDM upstream optical signal from the OFDM downstream optical signal, and to reuse a portion of the OFDM downstream optical signal as the OFDM upstream optical signal,
   wherein the at least one ONU comprising:
   an optical coupler configured to branch an orthogonal frequency division multiplexing (OFDM) downstream optical signal transmitted from an optical line terminal (OLT);
   an optical receiver configured to receive a portion of the OFDM downstream optical signal through the optical coupler; and an optical transmitter configured to modulate the remaining portion of the OFDM downstream optical signal through the optical coupler using a reflective modulator and to transmit a modulated OFDM upstream optical signal to the OLT, wherein the optical coupler configured to adjust the distributing ratio to increase the downstream optical signal supplied to the optical transmitter when the optical link length or the optical link power budget is increased.

2. The OLT of claim 1, wherein the seed light source is supplied in array type by allocating, per wavelength, a single longitudinal mode operated laser (SML) including at least one of a distributed feedback laser diode (DFB-LD), a distributed Bragg reflector (DBR) laser, an external cavity laser (ECL), and a vertical cavity surface emitting laser (VCSEL).

3. The OLT of claim 1, wherein the seed light source is supplied by spectrum-slicing a broadband light source from any one of an erbium doped fiber amplifier (EDFA), a semiconductor optical amplifier (SOA), and a super-luminescent light emitting diode (SLED).

4. The OLT of claim 1, further comprising:
an optical amplifier configured to amplify the OFDM downstream optical signal based on an optical link length and a link power budget.

5. The OLT of claim 1, wherein the optical transmitter is configured to transmit the OFDM downstream optical signal based on an optical modulation index (OMI) of the OFDM downstream optical signal indicating a difference between a maximum value and a minimum value of the modulated OFDM downstream optical signal.

6. The OLT of claim 1, wherein the seed light source comprises a first wavelength band light source associated with the OFDM upstream optical signal and a second wavelength band light source associated with the OFDM downstream optical signal.

7. The OLT of claim 1, wherein in a case of a plurality of ONUs,
the plurality of ONUs is configured to share a plurality of OFDM subcarriers associated with the OFDM downstream optical signal, to obtain a wavelength of the OFDM upstream optical signal from the OFDM downstream optical signal, and to reuse a portion of the OFDM downstream optical signal as the OFDM upstream optical signal.

8. The OLT of claim 7, wherein the plurality of ONUs is configured to be allocated to a subcarrier that is not used in response to a bandwidth allocation request, or to release a subcarrier that is used in response to a bandwidth limiting request.

9. At least one optical network unit (ONU) of a hybrid passive optical network (PON) system, the ONU comprising:
an optical coupler configured to split an orthogonal frequency division multiplexing (OFDM) downstream optical signal transmitted from an optical line terminal (OLT);
an optical receiver configured to receive a portion of the OFDM downstream optical signal through the optical coupler; and
an optical transmitter configured to modulate a remaining portion of the OFDM downstream optical signal through the optical coupler using a reflective modulator and to transmit an OFDM upstream optical signal that is modulated to the OLT,
wherein a plurality of ONUs is configured to share one OFDM subcarrier associated with the OFDM downstream optical signal by time division multiplexing (TDM), to obtain a wavelength of the OFDM upstream optical signal from the OFDM downstream optical signal, and to reuse a portion of the OFDM downstream optical signal as the OFDM upstream optical signal,
wherein the optical coupler configured to adjust the distributing ratio to increase the downstream optical signal supplied to the optical transmitter when the optical link length or the optical link power budget is increased.

10. The ONU of claim 9, wherein the optical transmitter is configured to obtain a wavelength of the OFDM upstream optical signal from the OFDM downstream optical signal and to reuse a portion of the OFDM downstream optical signal as the OFDM upstream optical signal.

11. The ONU of claim 9, wherein the OLT includes a first wavelength band seed light source associated with the OFDM upstream optical signal and a second wavelength band seed light source associated with the OFDM downstream optical signal.

12. The ONU of claim 9, wherein in a case of a plurality of ONUs,
the plurality of ONUs is configured to share a plurality of OFDM subcarriers associated with the OFDM downstream optical signal, to obtain a wavelength of the OFDM upstream optical signal from the OFDM downstream optical signal, and to reuse a portion of the OFDM downstream optical signal as the OFDM upstream optical signal.

13. The ONU of claim 12, wherein the plurality of ONUs is configured to be allocated to a subcarrier that is not used in response to a bandwidth allocation request, or release a subcarrier that is used in response to a bandwidth limiting request.

* * * * *